Feb. 23, 1965     T. L. COLLINS     3,171,025
LONG STRAIGHT SECTIONS FOR ALTERNATING GRADIENT SYNCHROTRONS
Filed July 3, 1962     5 Sheets-Sheet 1

INVENTOR.
THOMAS L. COLLINS
BY Roland A. Anderson

INVENTOR.
THOMAS L. COLLINS

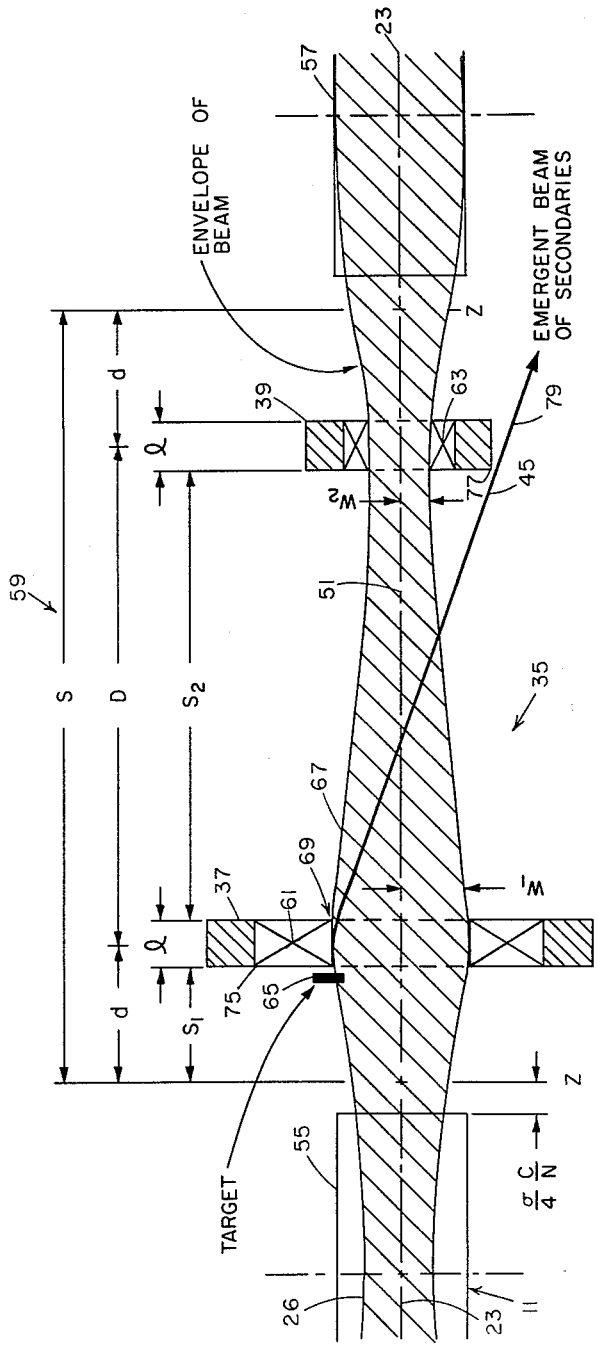

INVENTOR.
THOMAS L. COLLINS

Feb. 23, 1965 T. L. COLLINS 3,171,025
LONG STRAIGHT SECTIONS FOR ALTERNATING GRADIENT SYNCHROTRONS
Filed July 3, 1962 5 Sheets-Sheet 5

INVENTOR.
THOMAS L. COLLINS
BY Roland G. Anderson

United States Patent Office 3,171,025
Patented Feb. 23, 1965

3,171,025
LONG STRAIGHT SECTIONS FOR ALTERNATING GRADIENT SYNCHROTRONS
Thomas L. Collins, Watertown, Mass., assignor to the United States of America as represented by the United States Atomic Energy Commission
Filed July 3, 1962, Ser. No. 207,445
10 Claims. (Cl. 250—41.9)

This invention relates to apparatus for accomplishing the extraction of particles from a high energy charged particle source and more particularly to apparatus for extracting secondary particles from a high energy proton source.

High energy physics has required larger and larger accelerators for a detailed knowledge of the fundamental particles of matter and among these accelerations the largest has been the alternating gradient synchrontron which has required a one half mile particle equilibrium orbit in accelerating positively charged protons to high energies, e.g. between about 15 bev. and about 33 bev. This machine has provided a break-through in the energy ceilings encountered theretofore and to this end has combined the radio-frequency acceleration of the cyclotron in synchronization with the increasing energization of the endless ring-shaped magnet array of the betatron, leading to the use of the same synchrotron, and also has employed the alternating gradient or strong focusing principle described, for example, in "The Annals of Physics" 3, 1–48 (1958). This latter principle has provided much stronger focusing than the prior synchrotrons, leading to betatron oscillations of smaller amplitude around the equilibrium orbit and consequently about a ten times smaller evacuated tube aperture requirement and smaller magnet size and cost for a given machine size. The tube aperture for the Brookhaven Alternating Gradient Synchrontron, for example, has had a uniform oblong cross-section only six inches wide by two and three quarter inches high as described in "Brookhaven Alternating Gradient Synchrontrons" by G. K. Green printed in the Proceedings of the International Conference on High Energy Accelerators and Instrumentation—CERN 1959.

As described in "The Brookhaven Alternating Gradient Synchrotron" by John P. Blewett, in the 1960 International Conference Record, as well as other publications, the Brookhaven Alternating Gradient Synchrotron has had an annular array of closely spaced combined bending and focusing particle confining magnet sectors astride the beam equilibrium orbit leaving only a maximum of about 10 feet or one magnet sector length between magnets. These magnets have had a maximum saturation of 13,000 gauss to limit residual magnetism. Also, these combined function magnets for this and other alternating gradient synchroton's known heretofore have been employed with circular proton equilibrium beam orbits and an endless evacuated tube around the orbit with short straight tube sections the sides of which a .25 inch diameter 33 bev. beam of protons was prevented from hitting when the particles travelled along the equilibrium orbit. To this end, these straight sections, have had a maximum length of one thirtieth of the betatron wave length, i.e., about one magnet sector of 10 feet or a clear length of one half the period length of two focusing magnet sectors and a target has been driven into the beam in a magnet free straight section between two confining magnet sectors for the removal of secondary particles from the beam through the aperture of one of the combined function magnets.

The heretofore known extraction of secondary particles from the beam has lead to difficulties which have been particularly difficult of solution because the targets have been bombarded by the beam inside the accelerator tube to produce secondary particles which have been analyzed and focused outside the accelerator by bending magnets, quadrupole magnets and mass separators such as disclosed in U.S. application S.N. 70,877 filed November 18, 1960, now Patent No. 3,056,023 issued September 25, 1962. These arrangements have been successful in accomplishing the desired analyzing and focusing of the secondaries but, heretofore, the secondaries have been concentrated at very small angles to the source or equilibrium orbit of the beam in the accelerator, e.g. about ⅓ × 17 mrad ≡ 1°, and it has been difficult to place the necessary bending magnets close to the accelerator tube, to capture maximum numbers of the secondary particles, or otherwise to manipulate the target inside the tube and extract the secondaries so as to clear the main confining magnet sectors. It has universally been recognized, therefore, that it would be advantageous to provide improved extraction, more widely spaced confining magnets, or extraction at sharper angles to the beam axis but heretofore, these functions and structures have not been thought possible or the various proposals have been unsuccessful or otherwise unsuitable.

It is an object of this invention, therefore, to provide an improved apparatus for separating secondary reaction products from a source of high energy protons.

It is further object of this invention to provide an improved apparatus for alternating synchroton.

It is still a further object of this invention to provide long straight sections for an alternating gradient synchrotron between widely spaced confining magnets.

In accordance with this invention two coaxial spaced quadrupole magnetic focusing lenses are placed coaxially around a straight tube section for receiving protons from a source and a target bombarded by said protons upstream from said first quadrupole produces secondary particles which pass through said first quadrupole at a sharp angle to the axis of said quadrupoles and clear the outside of said second quadrupole. The system of this invention utilizes standard and well known techniques and apparatus and is highly flexible for a wide range of applications, e.g. including alternating gradient synchrotrons capable of energies from 15 to 1000 bev. or more. More particularly, this invention contemplates particle separating apparatus for use with a source of highly energized protons, comprising spaced quadrupole first and second coaxial magnetic lenses for receiving and focusing said protons successively in alternate horizontal and vertical directions, said source being at the focal point of said first of said magnetic lenses, said second of said magnetic lenses being separated from said first lens to receive the protons and focus them at the focal point of said second lens, and means reacting a target relatively against said protons to produce secondary reaction products which pass through said first lens, are deflected thereby at a sharp angle to the axis of said lenses and clear the outside of said second quadrupole magnetic lens.

The above and further novel features of this invention will appear more fully from the following detailed description when the same is read in connection with the accompanying drawings. It is to be expressly understood, however, that the drawings are not intended as a definition of the invention, but are for the purpose of illustration only.

In the Figures where like parts are marked alike:

FIG. 8 is a partial cross-section of the elements of this invention illustrating the principles thereof;

Figure 1:
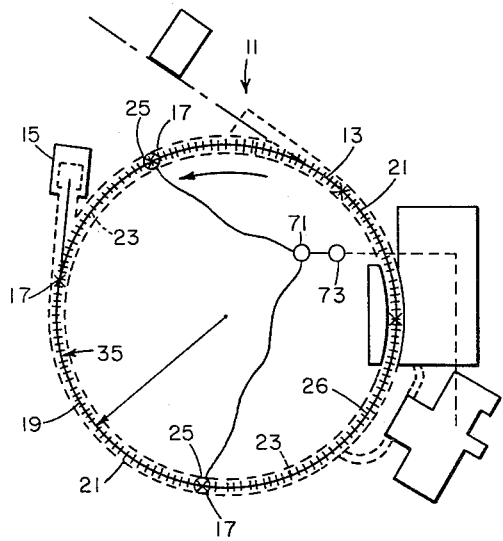
FIG. 1 is a schematic view of an alternating gradient synchrontron.

Referring now to FIG. 1 source 11 of a beam of high energy protons, comprises an alternating gradient synchrotron 13 such as the Brookhaven Alternating Gradient Synchrotron, which accelerates positively charged protons to energies of several billions of electron volts. In this accelerator linear accelerator 15 injects the protons into a magnet-free uniform cross-section 15 cm. x 7 cm. straight section 17 of evacuated endless tube 19 at about 50 mev. and an annular array of confining magnets 21 confine the movement of the particles along the endless one half mile equilibrium orbit 23 in the tube 19 and radio-frequency accelerating stations 25 (such as those shown) around further magnet-free straight sections 17 accelerates the particles in a beam 26 in one direction to multiple bev. energies, e.g. 33 bev. (billion electron volts). Advantageously, the confining magnets are pulsed with increasing energy in synchronization with increasing radio frequency energy from 1 to 5 megacycles per second up to about 80 kilowatts peak power to produce up to about $3 \times 10^{-11}$ particles per pulse.

The beam 26 of high energy protons must travel inside a tube 19 having a small cross-section for economy of confining magnets 21 and this requires the use of alternating gradient focusing confining magnets 21 or lenses 21 which produce a strong focusing effect, as is well known, under the influence of which the particles oscillate with a small amplitude betatron wave oscillation around equilibrium orbit 23 with a frequency of about 1–3 megacycles per second from injection to a full 33 bev. energy and a substantially constant wave length of about 300 feet.

Figure 2:
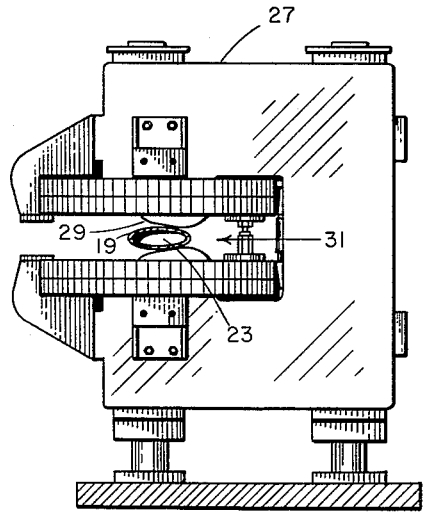
FIG. 2 is a partial side view of a combined bending and focusing magnet for the apparatus of FIG. 1.
Figure 12:
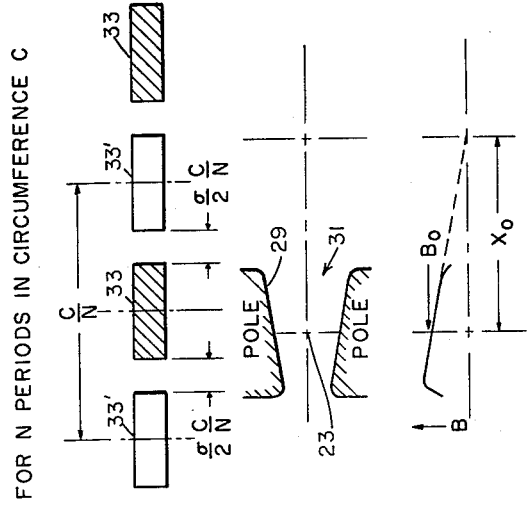
FIG. 12 is a partial schematic view of a magnet array for the apparatus of FIG. 1.

The confining magnets 21 have included the C-shaped magnet 27, shown for example in FIG. 2. This magnet 27 has opposite pole faces formed with a hyperbolic gradient 29 forming an aperture 31 along orbit 23. Advantageously, N number of these magnets 27, e.g. 240, are spaced around tube 19, which has a circumference C of one half mile so that $C/N$ equals one magnet period, as illustrated in FIG. 12, comprising magnets 27 arranged to form sectors 33 of one gradient which have unit horizontal magnification and sectors 33' of the opposite gradient which have unit vertical magnification as is well known and as is described in the above referenced publications.

Heretofore, these magnet sectors 33 have employed combined bending and focusing magets 27, comprising straight longitudinally extending magnets 27 placed athwart a circular equilibrium particle equilibrium orbit and tangent to the orbit at the center of the magnet 27 to bend the particle beam along the orbit while focusing the beam according to the alternating gradient or strong focusing principle. The magnets have been spaced periodically in an annular array around short straight sections 17 of tube 19 corresponding in length with one magnet sector 33 and magnet present and magnet free tube sections 17 have been joined to form an endless evacuated ring 35 or chamber in which the beam 26 has been accelerated. These straight sections 17 have had a maximum length of one thirtieth of the betatron wave length, i.e. about one magnet sector of 10 feet or a clear length of one half the period length of two magnet sectors. Ten feet has also been the maximum distance between magnet sectors 33.

Heretofore, extraction of secondary particles has been initiated in a short magnet free straight section 17 in which a target has been forced suddenly into the beam to produce secondary particles and these have passed through an aperture 31 of a combined bending and focusing C-shaped magnet 27 to deflect these secondaries at a small angle to the beam equilibrium orbit where upon these particles have passed through tube 19 and have then been confined after extraction by bending and focusing magnets such as described in, "The Strong Focusing Synchrotron—A New High Energy Accelerator" by E. D. Courant, M. S. Livingston and H. S. Synder in the Physical Review, vol. 88, No. 5, pp. 1190–1196, December 1, 1952. The charged primary and secondary particles and the mathematics of these mentioned confining magnets, including the quadrupole magnet shown in FIG. 9 of the mentioned Courant paper have been well known as mentioned, for example, in co-pending application S.N. 70,877. As explained therein, a source of charged secondary particles has been located at the focal point of a first lens on the central axis of two lenses and has been separated from the source a distance so that all of the particles entering the first lens from the source have left in the form of a parallel beam. Thus, the focal length for the first lens, making the usual analogy to optical lenses, has been the distance between the source and the first lens, hence the source has been located at the focal point at the first lens. The second lens has received the parallel beam from the first lens after a distance S. The rays upon leaving the second lens have converged at a second focal point, the focal point of the second lens. Thereupon, the beam of particles has crossed the second focal point and has entered a third lens which has been located from the second focal point a distance equal to its focal point.

Despite the fact that the use of the described confining and quadrupole magnets has been well known, quadrupole magnets have not been used heretofore to extract a beam of secondary particles from a primary high energy proton beam 26 in an alternating gradient synchrotron and the bombardment of a target by the proton beam has produced a beam of secondaries at an angle to the equilibrium orbit of only about $\frac{1}{3} \times 17$ mrad $\equiv 1°$ making it difficult to place the necessary bending and focusing magnets close to the accelerator tube. In accordance with this invention an improved particle separating apparatus including quadrupole magnets around the primary beam separates secondary particles at increased angles up to about 17 mrad $\equiv 1°$ or more and it is possible to place bending magnets and the like much closer to the source of the secondary particles.

Figure 6:
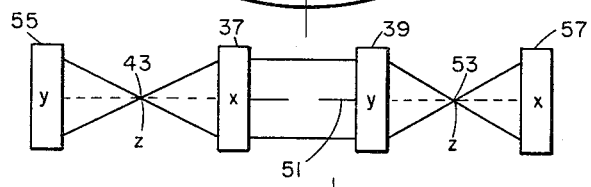
FIG. 6 is a partial diagrammatic view of a simple magnetic lens system incorporating quadrupole lenses such as are shown in FIG. 3 and FIG. 4.

Referring now to FIG. 6 particle separating apparatus, for use with a beam source of primary high energy protons, such as mentioned the beam in an alternating gradient, comprises spaced quadrupole coaxial first and second magnetic lenses 37 and 39 for receiving and focusing protons in beam along the equilibrium orbit in alternate horizontal and vertical directions, said beam source being at the focal point 43 of said first lens 37, the upstream of said lenses 37 and 39, and said second lens 39 being separated from said first lens 37 to receive the protons in said beam and secondary reaction products which pass through said first lens 37 and are deflected thereby at a sharp angle to the axis of said lenses 37 and 39.

By disposing the $x$—$y$ axes of the second or downstream lens 39 rotated exactly 90° from the $x$—$y$ axes of first lens 37, the focusing system provided thereby has a unit magnification in both the horizontal and vertical directions. In this system the planes of quadrupole lenses 37 and 39 are parallel and the lenses have a coaxial z—z axis 51 which intersects with the mentioned orbit at the ends of the axis 51. Thus, these lenses 37 and 39 tend to focus the particles passing through the lenses in the particular transverse x and y planes at right angles to each other and passing through the z—z axis as is understood in the art. Lens 37, for example, advantageously focuses in the x or horizontal plane and lens 39 focuses in the alternate y or vertical plane to complete the focusing in all planes. Also the focal point 43 of lens 37 receives the beam of protons in their travel along their orbit and the focal point 53 of lens 39 corresponds with this orbit to transfer the beam back to this orbit. To this end, the lenses 37 and 39 advantageously focus in alternate x and y planes with adjacent magnetic lenses 55 and 57 which focus, for example, advantageously y and x planes respectively and which have focal points corresponding with focal points 43 and 53 respectively as shown in FIG. 6.

In breaking into a machine of a particle configuration, for example the Brookhaven Alternating Gradient Synchrotron configuration, the transform matrix of the inserted straight section element 59 should be:

$$\begin{pmatrix} \cos\phi + \alpha\sin\phi & \beta\sin\phi \\ -\frac{1}{\beta}(1+\alpha^2)\sin\phi & \cos\phi - \alpha\sin\phi \end{pmatrix}$$

where $\beta$ and $\alpha$ are the betatron functions at the point of insertion ($\alpha = \frac{1}{2} d\beta/ds$). This element reproduces $\beta$ and $\alpha$ and has the only effect of adding $\phi$ to the phase angle of the betatron oscillations. We can use any value of $\phi$. A transform of this kind is produced by the two appropriately spaced quadrupoles 37 and 39 (see FIG. 8 for symbols), one focusing in the x plane and the other defocusing in the x plane. The analysis is simplified by treating the quadrupoles as thin lenses having focal powers $1/f = k \sin kl$ and $-k \sinh ke$, respectively. The transformation is given by the product:

$$\begin{pmatrix} 1 & d \\ 0 & 1 \end{pmatrix} \begin{pmatrix} 1 & 0 \\ k\sinh kl & 1 \end{pmatrix} \begin{pmatrix} 1 & D \\ 0 & 1 \end{pmatrix} \begin{pmatrix} 1 & 0 \\ -k\sin kl & 1 \end{pmatrix} \begin{pmatrix} 1 & d \\ 0 & 1 \end{pmatrix}$$

Assuming that $\theta = 90°$, a value which is the optimum for this simple element 59, the above product is then equated to:

$$\begin{pmatrix} \alpha & \beta \\ -(1+\alpha^2)/\beta & -\alpha \end{pmatrix}$$

from which it is quickly verified that we require:

$d = \beta/(1+\alpha^2)$ $D = \beta\alpha^2/(1+\alpha^2)$ $k = (\sin kl + \sinh kl) = 2(1+\alpha^2)/\alpha\beta$ $k^2 l = (1+\alpha^2)/\alpha\beta$ with very little approximation.

For a long straight length along the axis 51 of lenses 37 and 39 between the lens centers 61 and 63, for example, a length sufficient for positive low momentum secondary particles to pass through lens 37 and clear the outside of lens 39, the center of the straight section 59 is inserted where $\alpha$ is large. In a simple machine structure, e.g. in a 33 bev. Alternating Gradient Synchrotron where long straight section 59 is used for this purpose, this point is the center of the straight section 59 mid-way between lenses 37 and 39 which are 19 feet apart and this automatically assures that we satisfy our criterion for both horizontal and vertical betatron oscillations. For a typical machine, $\alpha = 2$, $\beta = 0.8$ times the period length, so $D = .64$ and $S = D + 2d = .96$ times the period length. It will readily be apparent, therefore, that straight section 59 as well as the distance between lenses 37 and 39 is longer than one half the period length. Also, the quadrupoles 37 and 39 are separate function magnets, i.e., have not proton bending function, and have a maximum saturation of up to about 20,000 gauss making it possible to deflect more secondary particles therein at increased angles.

Figure 9:
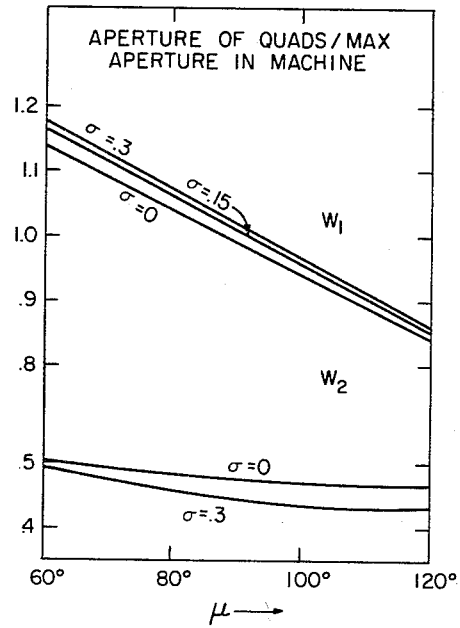
FIG. 9 is a graphic representation for determining aperture dimensions of the quadrupole magnets of FIG. 8.
Figure 10:
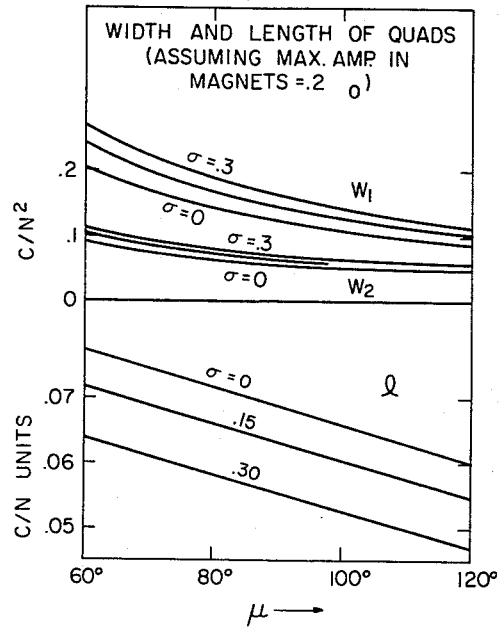
FIG. 10 is a graphic representation for determining the width and length of the quadrupole magnets of FIG. 8.
Figure 11:
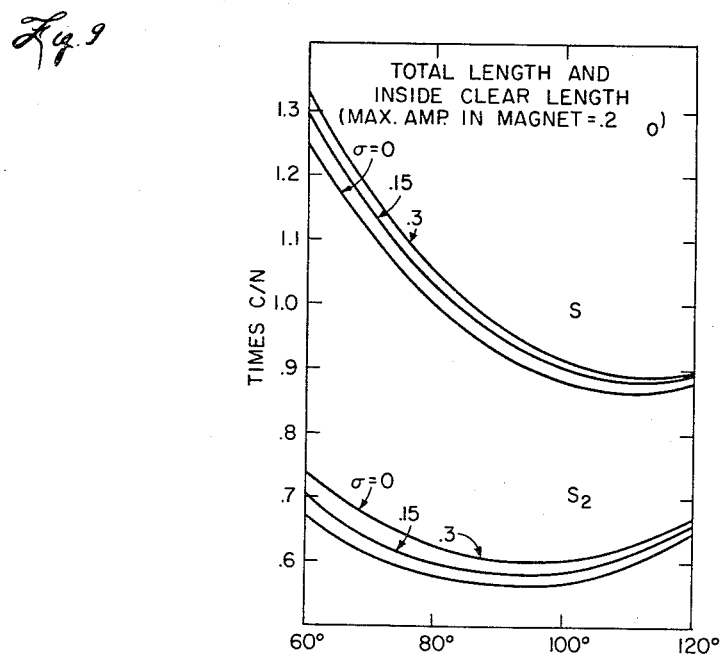
FIG. 11 is a graphic representation for determining the length of the straight section of FIG. 8.
Figure 13:
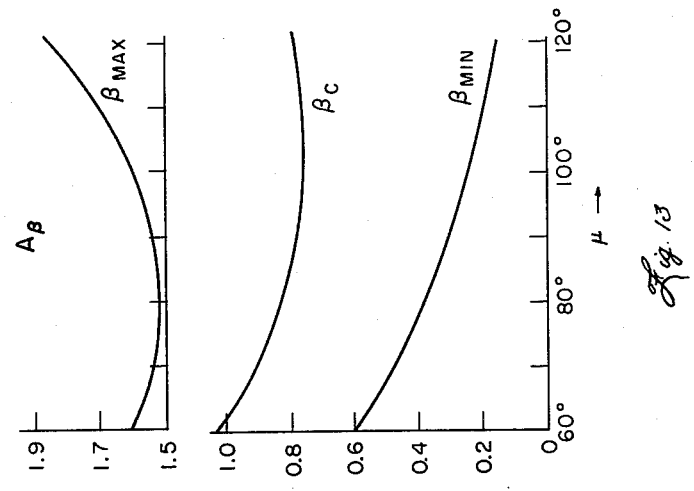
FIG. 13 is a graphic representation of another embodiment of the apparatus of FIG. 1.

Referring to FIGS. 9, 10 and 11, in order to find reasonable dimensions for quadrupoles 37 and 39, for a simple alternating gradient synchrotron machine with similar alternate focusing and defocusing magnets 55 and 57 separated by straight sections 59 one needs only numerical values for:

C, the machine circumference
N, the number of periods
$\sigma$, the fraction of C in straight sections
$\mu$, the phase angle per period $$\mu = v(360°)/N$$

One advantageous method of presenting parameters for any machine is to present longitudinal lengths measured in units $C/N$, and the period length and transverse dimensions measured in units of $C/N^2$. This eliminates C and N from further consideration and orbit parameter may be presented as functions of $\mu$ and $\sigma$ only, both of which conveniently have a quite restricted range. Reference will be made to the characteristic length of an alternating gradient synchrotron machine magnet, $X_0$ such as magnet 27 in FIG. 2. This length $X_0$ is the transverse distance in which the field would fall to zero if the gradient persisted, as shown in FIG. 12. This term, then is used in place of $n = \beta/X_0$, the gradient index.

FIG. 9 compares the quadrupole aperture to the maximum aperture required in the machine magnets of $\beta$ max. This has been computed by first finding $\beta_q$, the value in the quadrupole using the free space formula:

$$\beta_q = \beta \pm 2\alpha d + (1+\alpha^2)d^2/\beta$$

and then finding:

$(\beta_q/\beta \text{ max.})$ 1/2

FIG. 10 gives the length of the quadrupole in units of $C/N$, and restating the aperture in units of $C/N^2$. This requires two assumptions:

(1) The aperture required in the machine is $\pm 0.2x_0$
(2) The maximum field in the quadrupole is $\beta_0$, the field at the isomagnetic of the machine magnets.

Both the length $l$ and the apertures $w_1$, $w_2$, are proportional to $0.2x_0$ and may be readily readjusted. The computation utilized $k^2 = 1/pw_1 = [2\pi/1-\sigma)w_1]N/C$ and the formula for $k^2 l$.

FIG. 11, is a graph of the total length S and the clear inside length $S_2$. If $0.2x_0$ is changed $S_2$ must be decreased by the increase in $l$.

In inserting lenses 35 and 37 the important characteristics of the orbits in alternating gradient focusing systems for synchrotrons may be summarized by treating the lens elements as being of equal length and following each other directly without inclusion of field free straight sections. Each lens element is of length L, F indicates a focusing element and D indicates a defocusing element. The lenses are arranged around a ring of radius R.

The derivation of the orbit through an A.G. System has been described by E. D. Courant and H. S. Snyder in vol. 3, pp. 1–48 of, "Annals of Physics" 1958. In this paper it is shown that an alternating gradient synchrotron having A.G. magnet sections arranged in sectors for reversing the field gradient in adjacent magnet sectors and including horizontally focusing sections and vertically focusing sections, has rays traced through the magnets according to the constant $x(1+\beta'^2/4) - xx'\beta\beta' + x'^2\beta^2$ where $\beta$ is the quantity defined by $$x = A_\beta^{1/2}(s) \cos(v\phi(s) + C$$

where $x$ represents deviation in either the vertical or radial direction $(m)$, $s$ represents the distance along the orbit $(m)$, $\beta$ is a periodic amplitude function with period $2L(m)$, $v$ is a constant representing the total number of betatron oscillations around the circumference of said tube, $$\phi(s) = \frac{ds}{\nu\beta}$$

and is a function whose derivative is periodic with period 2L, and A and C are constants determined by initial conditions. If the above constant is preserved at re-entrance, the maximization of the distance $S_2$ is:

$$S_1 = \frac{\beta}{1-\beta'^2/4} \qquad S_2 = \frac{\beta\beta'^2/4}{1+\beta'^2/4} \qquad F = \frac{\pm\beta\beta^{1/2}}{1+\beta'^2/4}$$

From these results it is evident that the long straight section cannot be included in the middle of a focusing or defocusing sector where $\beta'$ is zero, but must be included between a focusing and defocusing sector where $\beta'$ has its maximum value of about 3.5.

Target 65 advantageously comprises a flat blade, such as an aluminum or other metallic blade which is held inside tube 19 close to the inside edge of the beam envelope 67 upstream of the inside annulus 69 of quadrupole 37. Upon reaching the high energization the main magnets which bend and focus beam 26 in a ring remain energized for a short period of time while the frequency of the radio-frequency accelerating stations 25 is reduced slowly by means of control 71, which is the known control for increasing the radio-frequency acceleration frequency. Thereupon the beam slowly loses energy and spirals slowly inwardly into target 65 to produce secondary radiation products at an angle to the axis 51 of lenses 37 and 39. At high energies, the bulk of the secondaries go straight forward in the direction of the tangents to the beam envelope 67 at the target 65. Negative secondary reaction products are bent by the first quadrupole 37 so that all of these will leave the tube 19 on the inside thereof. Lower momentum positive secondaries are bent strongly across the beam, leave tube 19 on its outside, and clear the outside dimension of the second quadrupole 39.

In the operation of the extractor 35 of this invention on alternating gradient synchrotron 13 provides a source 11 of protons in a beam 26 at focal point 43 of first quadrupole magnetic lens 37. Advantageously, lens 37 focuses the particles received thereby in a plane at 90° (i.e., opposite) to the plane of last focus and receives the mirror image produced by the magnetic lens 55 which precedes lens 37. In this regard it will be understood that if a particle passing through a focal point such as focal point 43 follows a wave shaped path which intersects orbit 23 and the z—z axis at designated converging points along the orbit and the z—z axis that all the other charged particles in the beam 26 having different directions of momentum will also intersect this orbit and axis 51 at the same points. Accordingly, focal point 43 is located a distance from lens 37 so that all the particles entering lens 37 from focal point 43 will leave in the form of a parallel beam. Additionally, lens 39 follows lens 37 at a distance to transform the parallel beam to a focus at focal point 53 and the magnetic lens 57 which comes after lens 39 receives the mirror image of lens 39.

The beam 26 is brought up to high energy and the confining magnets 27 confining and focusing the beam 26 along orbit 23 momentarily remain at high field strength while the radio-frequency acceleration at radio-frequency stations 25 is reduced by control 71 which slowly reduces the frequency of the power from power source 23 to radio-frequency stations 25. This slowly reduces the energy in beam 26 so that the beam slowly spirals inwardly into target 65 producing positive and negative secondary particles of various momenta which go forward and at an angle to the inside and outside of the beam.

The positive secondary particles 45, pass through horizontal focusing lens 37, and the poles of the lenses 37 and 39 are arranged with the target at lens side 75, which is on the x axis, upstream of lens 37 just inside the diameter of the circular aperture 69 of the lens 37 so that the particles 45 emerge from the quadrupole 37 on the opposite side 77 of the quadrupole 39 on the x axis in a beam 79 as shown in FIG. 8.

The lenses 37 and 39 are energized concurrently and can be energized concurrently oppositely through standard coils C and $C^x_1$ from a suitable source (as is well known) with the other confining magnets of alternating gradient synchrotron 13, specifically in sequence with the upstream adjacent lens 55 and the downstream lens 57. The maximum saturation in lenses 37 and 39, however, is much more than that of the adjacent lenses 55 and 57 since these adjacent lenses 55 and 57 are combined focusing and bending magnets for the primary protons, whereas the lenses 37 and 39 are focusing lenses only for the primary proton particles. Also, since this function of lenses 37 and 39 is substantially a separate focusing function with regard to the protons the maximum field of lenses 37 and 39 can be higher than the companion upstream and downstream combined function lenses and lenses 37 and 39 can effectively focus the proton beam therein along a straight equilibrium axis 51, at increased input and output angles to lens 55 and lens 57 and at increased distances between lenses 37 and 39 compared with the distances between lenses 55 and 57 and their adjacent upstream and downstream combined function bending and focusing alternating gradient magnets 27. To this end, the distance between lenses 37 and 39 can be sufficient so that the secondary particle beam 79 clears the downstream quadrupole lens 39. This is 19 feet, for example, in a 33 bev. alternating gradient synchrotron.

Referring to FIG. 8 the long straight section 56 and the quadrupoles 37 and 39 may be used in a 33 bev. alternating gradient synchrotron or a larger alternating gradient synchrotron of which a numerical example for a 1000 bev. machine is as follows:

Let—
$C = 24{,}000$ feet
$N = 144$
$\sigma = $ A few percent
$\mu = 80°$ ($\nu = 32$)
Then—
$C/N = 167$ feet
$C/N^2 = 14$ inches
$x_0$ will be $10''$ and $\pm .2 x_0 = \pm 2''$
$S = 171$ feet total length
$S_2 = 103$ feet clear length
$l = 11$ feet quadrupole length $2(w_1 \times w_2) = 4\frac{1}{2}'' \times 2''$ quadrupole aperture.

Figure 4:
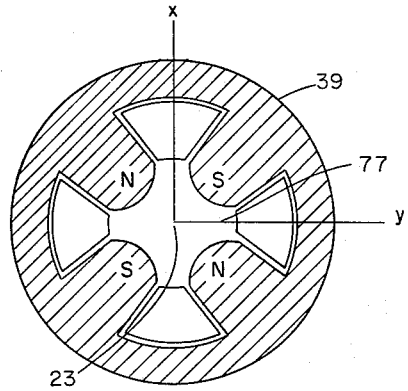
FIG. 4 is a partial cross-section at the center of the axis of the magnet like the magnet of FIG. 5 with the poles thereof rotated 90°.
Figure 3:
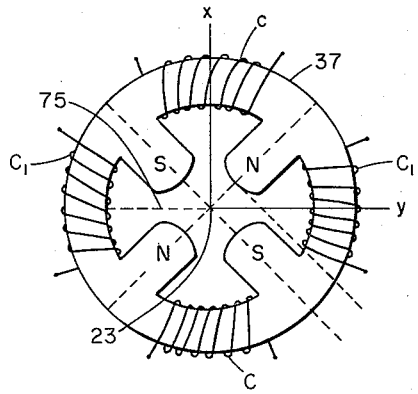
FIG. 3 is a partial side view of a focusing quadrupole magnet for the apparatus of FIG. 1.
Figure 7:
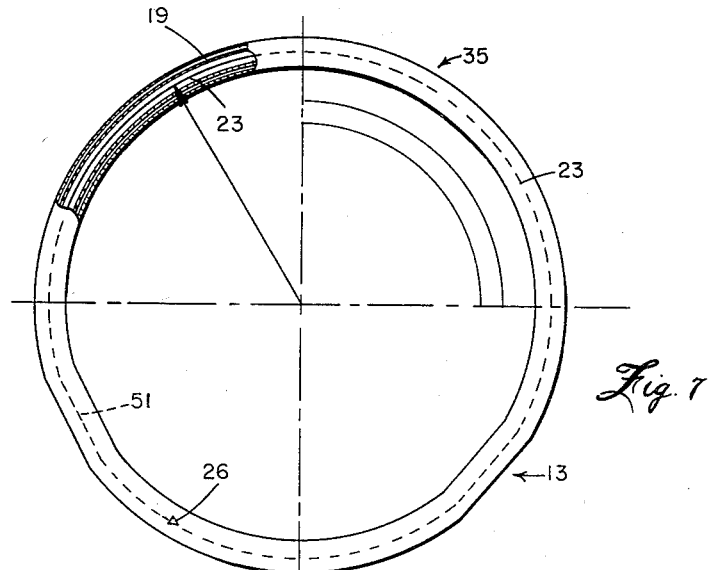
FIG. 7 is a partial top view of the apparatus of FIG. 1 showing the system of FIG. 6 incorporated therein.

In another embodiment quadrupoles 37 and 39 have rectangular apertures instead of the round apertures shown in FIGS. 3 and 4. It has been noted that in the horizontal plane the beam expands by about 30% at the first quadrupole lens 37. At the second quadrupole 39 it has contracted to about half of its original width. In the other plane the sequence is reversed. Consequently the apertures required in the quadrupoles differ radically in the two planes and rectangular quadrupoles may be used. If a target is located just after the first quadrupole, the emitted beam must clear only the short halft-width of the second quadrupole. In this case from estimates of quadrupole geometries it appears that a beam emitted from a target 65 at an angle of less than ½ degree will still be able to clear the second quadrupole. Also, it is noted that the quadrupoles need not be very long. For a focal length of 24 meters a quadrupole having field gradients of 2000 gauss per cm. must be about 7 meters long.

Figure 5:
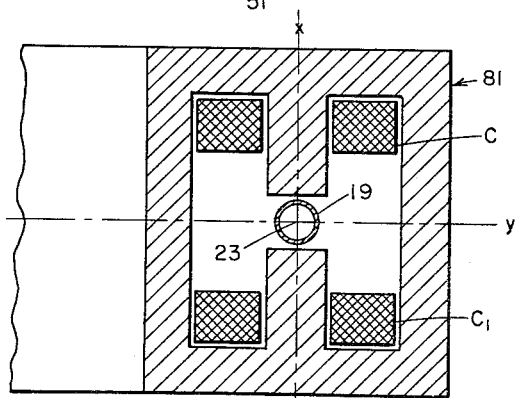
FIG. 5 is a partial cross-section of a bending magnet for the apparatus of FIG. 1.

In still another embodiment all the main magnets in the alternating gradient synchrotron are separate function focusing or bending magnets. In this embodiment the bending magnets are high-field H-magnets 81 such as shown in FIG. 5, and the focusing magnets are quadrupole magnets such as shown in FIGS. 3 and 4. This system permits longer straight sections and a slightly smaller circumference than in the alternating gradient synchrotron known heretofore, because of the maximum bending and focusing magnet fields are greater than with combined bending and focusing magnets. This embodiment also permits improved sensitivity to misalignment, beam side tracks and extraction at zero angle by the use of two of the described long straight sections having suitably placed bending magnets therebetween.

It is understood from the above, that a motor may also rotate a target rapidly into the primary proton beam to produce secondary particles.

It is also understood that the long straight sections of this invention permit the use of many functions in a single straight section, thus increasing the efficiency of the use of the straight sections. The functions include, for example, injection, extraction, acceleration, and other functions in one straight section.

This invention has the advantage of extracting secondary beams from a high energy proton beam source at sharp angles to the equilibrium orbit axis of the primary proton beam source, thus permitting the use of bending and focusing magnets close to the secondary beam source and the capture of more secondary particles. This invention also provides for long straight sections in an alternating gradient synchrotron permitting increased efficiency and ease of use of individual of the straight sections and a separate function alternating gradient synchrotron having separate function bending and focusing magnets.

I claim:

1. Particle separating apparatus for use with a circulating source of highly energized strongly focussed protons traveling along a $z$ axis, comprising spaced quadrupole magnetic first and second coaxial focusing lenses for receiving and focusing said protons successively in alternate horizontal $x$ and vertical $y$ directions at right angles to each other and to said $z$ axis, said source being at the focal point of said first of said magnetic lenses, said second of said magnetic lenses being separated from said first lens to receive the protons and focus them at the focal point of said second lens and means reacting a target relatively against said protons to produce secondary reaction products which pass through said first lens and are deflected thereby at a sharp angle to the axis of said lenses thereby to clear the outside of said second magnet.

2. Particle separating apparatus for use with a circulating source of highly energized strongly focussed protons traveling along a $z$—$z$ axis, comprising spaced quadrupole alternating gradient magnetic first and second coaxial focusing lenses for receiving and focusing said protons in successive stages in transverse $x$—$y$ planes at right angles to each other and passing through said $z$—$z$ axis, said source being at the focal point of said first of said magnetic lenses, said second of said magnetic lenses being separated from said first lens to receive the particles forming a parallel beam from said first lens and focus said protons therein at the focal point of said second lens for the return of said protons to said first lens, and means reacting a target relatively against said protons to produce secondary reaction products which pass through said first lens and are deflected thereby at a sharp angle to the axis of said first lens.

3. Particle separating apparatus for use with a circulating source of highly energized strongly focussed protons traveling along in a $z$ direction, comprising spaced alternating gradient first and second coaxial strong focusing lenses for receiving and focusing said protons in successive stages in transverse $x$ and $y$ planes at right angles to each other and passing through said $z$—$z$ axis, said source being at the focal point of said first of said magnetic lenses, said second of said magnetic lenses being separated from said first lens to receive the particles forming a parallel beam from said first lens and focus said protons therein at the focal point of said second lens, means for reacting a target relatively against said protons to produce secondary reaction products which pass through said first lens and are deflected thereby at a sharp angle to the axis of said first and second lenses, and means for returning said protons passing through said second lens to said first lens.

4. Particle separating apparatus for use with a circulating source of highly energized strongly focussed protons traveling along in a $z$ direction, comprising spaced quadrupole magnetic first and second coaxial focusing lenses for receiving and focusing said protons successively with unit magnifications in both the horizontal $x$ and vertical $y$ directions at right angles to each other and to said $z$ direction, said source being at the focal point of said first of said magnetic lenses, said second of said magnetic lenses being separated from said first lens to receive the particles forming a parallel beam from said first lens and to focus said protons in said beam at the focal point of said second lens, means for reacting a target relatively against said protons to produce secondary reaction products which pass through said first lens and are deflected thereby at a sharp angle to the axis of said lenses, and means for receiving said protons from said second lens and transmitting said protons to said first lens having alternating gradient magnetic lenses with unit magnifications in both the vertical and horizontal directions which correspond alternately with the unit magnifications of said first and second quadrupole lenses.

5. In a high energy alternating gradient synchrotron of the type having an endless evacuated oblong ring with a uniformly small oblong cross section for the acceleration of a beam of charged particles circulating in one direction along equilibrium $z$ orbit in said ring, comprising a long straight section inserted in said ring, upstream and downstream first and second spaced alternating gradient quadrupole magnetic focusing lenses around said straight section, said lenses periodically and sequentially focusing and defocusing said beam in $x$ and $y$ directions at right angles to each other and to said $z$ direction without bending in a plane passing through the axis of said straight section, and a target adjacent the inside upstream edge of said upstream magnet for impacting relatively against said beam to produce secondary particles which pass through said upstream beam and cross said equilibrium orbit.

6. In a high energy alternating gradient synchrotron of the type having an endless evacuated ring with a uniformly small oblong cross section for the acceleration of a beam of charged particles circulating in one direction along an equilibrium $z$ orbit in said ring, the improvement, comprising a long straight tube section in said ring, upstream and downstream first and second spaced alternating gradient quadrupole magnetic focusing lenses forming coaxial annuluses around said straight section, said lenses periodically and sequentially focusing and defocusing said beam in $x$ and $y$ directions at right angles to each other and to said $z$ direction without bending in a plane passing through the axis of said straight tube section, and a target inside said tube at a point upstream from the annulus of said upstream quadrupole lens for impacting relatively against said beam to produce charged secondary particles which pass through the annulus of said upstream quadrupole lens and are deflected thereby at a sharp angle to the equilibrium orbit so as to clear the outside upstream side of said downstream quadrupole lens.

7. In an alternating gradient synchrotron having an endless evacuated tube for the acceleration in one direction of a beam of protons to high energies, said tube having an oblong cross section, alternating gradient first magnet sections around said tube leaving magnet-free sections therebetween, said first magnet sections being arranged in sectors for reversing the field gradient in adajcent magnet sectors and including horizontally focusing sections and vertically focusing sections, the improvement comprising a long substantially magnet-free straight section of tube between horizontally and vertically focusing first magnet sections, spaced rectangular upstream and downstream quadrupole magnets rotated 90° from each other so that said upstream quadrupole focuses said beam in a vertical direction and follows a horizontally focusing alternating gradient first magnet section and said downstream quadrupole magnet focuses said beam in a horizontal direction and precedes a vertically focusing alternating gradient first magnet section, a target before the inside upstream edge of said focusing quadrupole magnet, and means for moving said beam relatively slowly against said target so as to produce secondary reaction products, the majority of said secondary reaction products going forward along the beam axis, and the minority of said secondary reaction products including relatively low momentum positive secondaries directed through said upstream quadrupole magnet and across said beam at a relatively sharp angle to said beam axis to clear the upstream edge of said downstream quadrupole magnet for the removal of said positive secondaries from said machine on the side of the machine opposite to the side where said target is located.

8. In an alternating gradient synchrotron having an endless evacuated tube for the acceleration in one direction of a beam of protons to high energies, said tube having an oblong cross section, and alternating gradient first magnet sections around said tube leaving magnet-free sections along said tube between said first magnet sections, said first magnet sections being arranged in sectors for reversing the field gradient in adjacent magnet sectors and including horizontally focusing sections and vertically focusing sections, and said magnets having rays traced according to the constant $x(1+\beta'^{2}/4)-xx'\beta\beta'+x'^{2}\beta^{2}$ where $\beta$ is the quantity defined by $x=A\beta^{1/2}(s)\cos(\nu\phi(s)+C$ where $x$ represents deviation in either the vertical or radial direction $(m)$, $s$ represents the distance along the orbit $(m)$, $\beta$ is a periodic amplitude function with period $2L(m)$, $\nu$ is a constant representing the total number of betatron oscillations around the circumference of said tube $$\phi(s) = \int \frac{ds}{\nu\beta}$$

and is a function whose derivative is a periodic with period $2L$ and $A$ and $C$ are constants determined by initial conditions, the improvement comprising a long substantially magnet-free straight section of tube between horizontally and vertically focusing first magnet sections, spaced upstream and downstream quadrupole magnets rotated 90° from each other around said straight section so that said upstreams quadrupole focuses said beam in a plane and said downstream beam defocuses said beam in said plane, and means for producing reaction products which pass through said upstream quadrupole magnet, cross said beam axis at a sharp angle and clear said upstream side of downstream quadrupole magnet for the removal of said products from said tube.

9. In an alternating gradient synchrotron having an endless evacuated tube for the acceleration and circulation in one direction of a beam of charged particles up to at least one bev. in a beam having an outside envelope in said tube, said tube having an oblong aperture, and alternating gradient guide magnets around said tube, said guide magnets being arranged in sectors for reversing the field gradient every two magnet sectors and including horizontally and vertically focusing magnet sectors, the improvement comprising a long straight section of tube between a horizontally focusing alternating gradient guide magnet and a vertically focusing alternating gradient guide magnet, adjacent spaced focusing and defocusing quadrupole magnets around said straight section of tube, a target before the inside upstream edge of said horizontally focusing quadrupole magnet, and means for moving said beam into said target envelope slowly so as to produce secondary reaction products, the major portion of said secondaries going forward along the beam axis, and the minor portion of said secondaries including negative secondary products which are directed toward the inside of said tube and low momentum positive secondaries being directed at a relatively sharp angle to said beam axis across said beam to clear said upstream side of said defocusing second quadrupole magnet and thereby to leave said tube on its outside.

10. Particle focusing apparatus for use with highly energized, strongly focused, charged particles circulating along a $z$ axis around an endless ring, comprising spaced quadrupole magnetic first and second co-axial focusing lenses for receiving and focusing said particles successively in alternate horizontal $x$ and vertical $y$ directions during part of said particle along said $z$ axis at right angles to said $x$ and $y$ directions circulation cycle for facilitating the circulation of said particles in long magnet-free sections between said first and second lenses which exceeds the length of said lenses.

References Cited by the Examiner
UNITED STATES PATENTS 2,599,188    6/52    Livingston _____ 313—62
2,882,396    4/59    Courant et al. _____ 328—235

OTHER REFERENCES

"High-Energy Accelerators," M. S. Livingston, Interscience Publishers Inc., New York, 1954, Chapters 6 and 7.

"Principles of Cyclic Particle Accelerators," J. J. Livingood, D. Van Nostrand Company, Inc., Princeton, New Jersey, 1961, Chapters 9 and 15.

RALPH G. NILSON, *Primary Examiner.*

UNITED STATES PATENT OFFICE
CERTIFICATE OF CORRECTION

Patent No. 3,171,025                                              February 23, 1965

Thomas L. Collins

It is hereby certified that error appears in the above numbered patent requiring correction and that the said Letters Patent should read as corrected below.

Column 12, lines 35 and 36, strike out "along said z axis at right angles to said x and y directions" and insert the same after "particles" in line 37, same column 12.

Signed and sealed this 10th day of August 1965.

(SEAL)
Attest:

ERNEST W. SWIDER                                   EDWARD J. BRENNER
Attesting Officer                                      Commissioner of Patents